United States Patent
Saito et al.

(10) Patent No.: US 7,876,829 B2
(45) Date of Patent: Jan. 25, 2011

(54) MOTION COMPENSATION IMAGE CODING DEVICE AND CODING METHOD

(75) Inventors: Shohei Saito, Yokohama (JP); Masaru Hase, Kodaira (JP); Fumitaka Izuhara, Kokubunji (JP); Seiji Mochizuki, Kodaira (JP)

(73) Assignee: Renesas Electronics Corporation, Kanagawa (JP)

( * ) Notice: Subject to any disclaimer, the term of this patent is extended or adjusted under 35 U.S.C. 154(b) by 1461 days.

(21) Appl. No.: 11/286,427

(22) Filed: Nov. 25, 2005

(65) Prior Publication Data

US 2006/0126741 A1    Jun. 15, 2006

(30) Foreign Application Priority Data

Dec. 6, 2004    (JP)    ............................ 2004-352384

(51) Int. Cl.
H04N 7/12    (2006.01)
(52) U.S. Cl. ............................................. 375/240.16
(58) Field of Classification Search ......... 382/232–251; 375/24.01–240.29; 348/390.1–425.1
See application file for complete search history.

(56) References Cited

U.S. PATENT DOCUMENTS 6,108,449 A * 8/2000 Sekiguchi et al. ........... 382/236
6,381,277 B1 * 4/2002 Chun et al. ............. 375/240.12
2004/0081238 A1 * 4/2004 Parhy .................... 375/240.16
2004/0258154 A1 * 12/2004 Liu et al. ............... 375/240.16

FOREIGN PATENT DOCUMENTS

| JP | 11-239354 | 8/1999 |
|---|---|---|
| JP | 2003-284091 | 10/2003 |
| JP | 2004-048552 | 2/2004 |
| JP | 2004-128749 | 4/2004 |

\* cited by examiner

*Primary Examiner*—Sherali Ishrat
(74) *Attorney, Agent, or Firm*—Antonelli, Terry, Stout & Kraus, LLP.

(57) ABSTRACT

The present invention provides a technology that is implemented in a motion compensation image coding device or a coding method and intended to code motion picture data in real time by performing a decreased number of arithmetic operations so as to determine a motion vector. In motion compensation image coding, macroblocks and sub-blocks into which each of the macroblocks is divided are searched for a motion vector with integer pixel precision. Based on the results of the search, a shape of a block that should be searched for a motion vector with decimal pixel precision is determined as a shape mode. The block of the shape mode is searched for a motion vector with decimal pixel precision, whereby a motion vector needed to produce predictive image data is determined.

10 Claims, 10 Drawing Sheets

INTEGER PIXEL PRECISION: A, B, C, D, a TO p
1/4 PIXEL PRECISION: E TO M

MOTION COMPENSATION IMAGE CODING DEVICE AND CODING METHOD

BACKGROUND OF THE INVENTION (1) Field of the Invention

The present invention relates to a motion compensation image coding device and coding method. More particularly, the present invention is concerned with a coding technology for compressing motion picture data, that is, for compensating or predicting a motion in units of each of blocks into which frame data contained in motion picture data is divided, and coding a residual signal, which represents a difference between produced predictive image data and the frame data of the motion picture data, and motion data (that is, a motion vector). The present invention is concerned especially with a technology for searching a motion vector that is included in the compressive coding technology.

(2) Description of the Related Art

In recent years, motion picture coding devices that adopt interpolative coding, motion compensation prediction, orthogonal transformation, quantization, and variable length coding and that are represented by a device conformable to the MPEG (Moving Picture Experts Group) standards have widely prevailed. In motion compensation prediction, a motion is inferred from a reference frame and a predictive residual signal and a motion vector are coded. According to internationally standardized motion picture coding methods including those stipulated by the ITU-T Recommendation H.263 and the ISO/IEC International Standard 14496-2 (MPEG-4 Visual), data of a frame image is divided into 16×16-pixel blocks that are called as macroblocks, and each of the macroblocks is divided into 8×8-pixel blocks. A motion is compensated or predicted in units of a block.

Moreover, according to the H.264/AVC standard stipulating a coding method characterized by a higher compression rate, a macroblock is divided into a plurality of blocks (sub-blocks) each having 16 pixels lined in rows and 8 pixels lined in columns, having 8 pixels lined in rows and 16 pixels lined in columns, having 8 pixels lined in rows and columns alike, having 4 pixels lined in rows and 8 pixels lined in columns, having 8 pixels lined in rows and 4 pixels lined in columns, or having 4 pixels lined in rows and columns alike. A motion is compensated or predicted in each of the blocks. The technology has been disclosed in "Text of International Standard of Joint Video Specification" recommended by the Joint Video Team (JVT) of ISO/IEC MPEG & ITU-T VCEG and "Advanced Video Coding" by the ITU-T Rec. H.264 & ISO/IEC 14496-10 standards (December 2003). The employment of a plurality of sub-blocks makes it possible to predict a motion using any image data including data of a monotonous and motionless image to data of a finely and complexly motional image.

According to the coding methods stipulated by the MPEG-4 and H.264/AVC standards, a motion is compensated or predicted with ½ or ¼ pixel precision. When it says that a motion is compensated or predicted with ½ or ¼ pixel precision, it signifies a method of interpolating virtual pixels located at half or quarter pixel positions using actual pixels located at integer pixel positions, and thus improving precision in motion prediction.

In conventional motion picture data coding, after all macroblocks and sub-blocks are searched for motion data (a motion vector) detectable with decimal pixel precision, an optimal motion vector is determined. Moreover, a technology for varying pixel precision, with which motion vectors are searched, depending on the shape or size of a block has been proposed in, for example, Japanese Patent Laid-Open No. 2004-48552.

SUMMARY OF THE INVENTION

When numerous kinds of blocks including macroblocks and sub-blocks are employed as stipulated by the H.264/AVC standard, a problem arises. Namely, assume that a motion vector detectable with decimal pixel precision is calculated from each of macroblocks and a plurality of kinds of sub-blocks, an optimal motion vector is determined in order to produce predictive image data, and the predictive image data is used to compensate a motion. In this case, the number of arithmetic operations to be performed in order to produce the predictive image data is very large. In particular, there is difficulty in coding large-size frame image data in real time.

The technology of varying pixel precision, with which a motion vector is searched, depending on the shape or size of a block may degrade coding efficiency. Moreover, decimal pixel precision may be associated on a fixed basis with a shape of a block that is coded inefficiently.

The present invention can be applied to a coding method of searching macroblocks and a plurality of kinds of sub-blocks for a motion vector with integer precision or decimal pixel precision, and then code image data with motion data compensated. The present invention provides a technology helpful in greatly reducing the number of arithmetic operations to be performed in order to search a motion vector while substantially ensuring high image quality. The technology in accordance with the present invention is adapted to a motion compensation image coding device and a program that gives instructions to a computer so as to code image data with motion data compensated.

The present invention has constitutional features described below. Namely, a motion compensation image coding device in accordance with the present invention includes a motion vector search unit. The motion vector search unit includes: a first motion vector detecting part that searches a plurality of first pixel blocks and sub-blocks of different shapes, into which each of the first pixel blocks is divided, for a motion vector with integer pixel precision; a shape mode selection part that selects one sub-block or a plurality of sub-blocks on the basis of information acquired by the first motion vector detecting part; and a second motion vector detecting part that searches the one sub-block or the plurality of sub-blocks, which is selected by the shape mode selection part, for a motion vector with decimal pixel precision. The device in accordance with the present invention is characterized by the shape mode selection part that determines a type of blocks to be searched for a motion vector with decimal pixel precision. The present invention searches the plurality of first pixel blocks and the sub-blocks of different shapes, into which each of the plurality of first pixel blocks is divided, for a motion vector with integer pixel precision. Based on information acquired by the search, the shape mode selection part determines a block type.

According to the present invention, when motion data contained in each of macroblocks and sub-blocks is compensated or predicted with ½ or ¼ pixel precision in the same manner as it is according to the motion picture coding methods stipulated by the MPEG-4 and H.264/AVC standards, the number of blocks to be searched for a motion vector with ½ or ¼ pixel precision is greatly decreased. Consequently, an amount of data to be interpolated by performing arithmetic operations can be markedly reduced. This leads to fast coding.

DESCRIPTION OF THE PREFERRED EMBODIMENTS

First Embodiment

Figure 1:
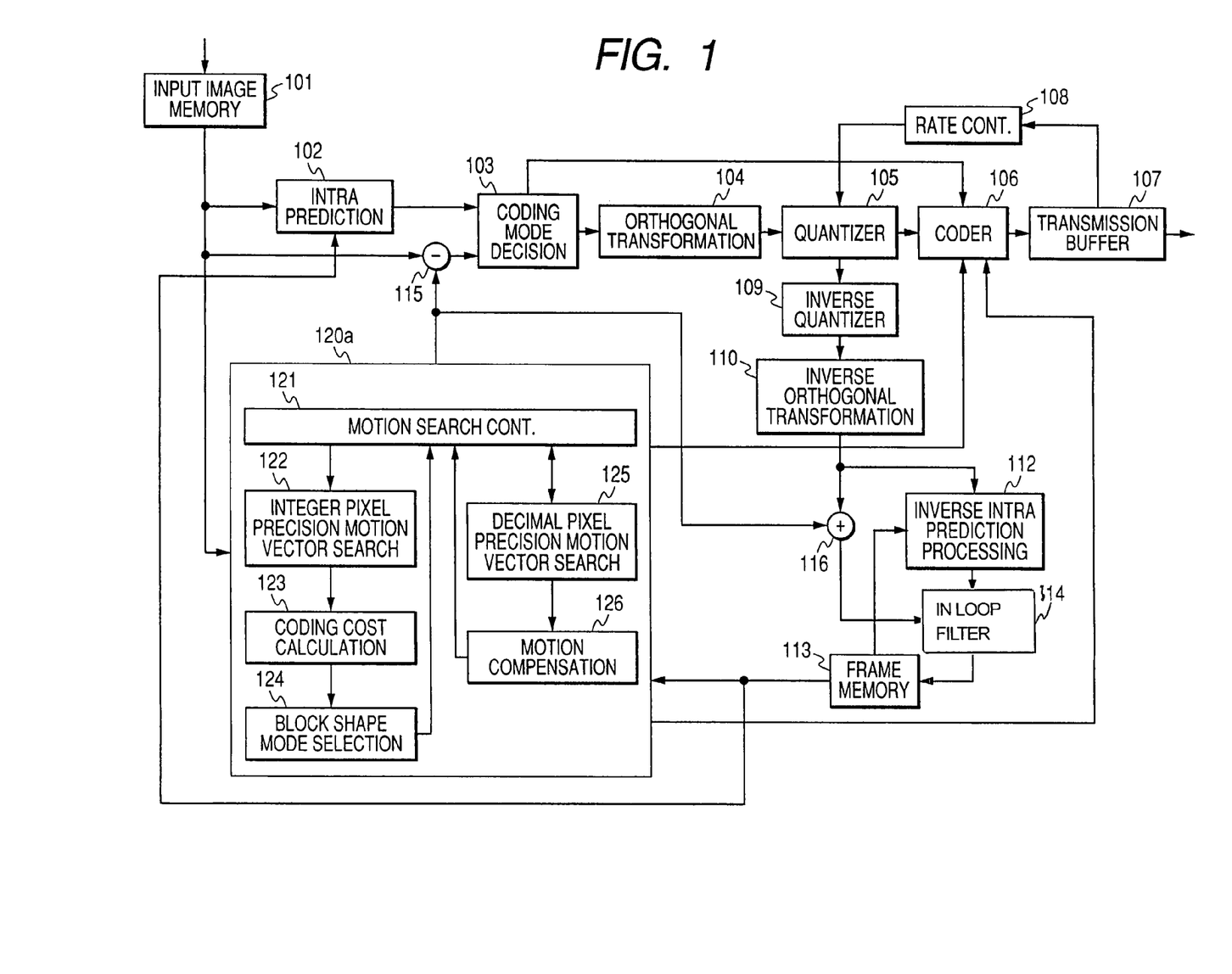
FIG. 1 is a block diagram showing the configuration of an embodiment of a motion compensation image coding device in accordance with the present invention.

FIG. 1 is a block diagram showing the configuration of an embodiment of a motion compensation image coding device in accordance with the present invention. As illustrated, the motion compensation image coding device includes an input image memory 101 in which image data is stored, an intra prediction part 102, a coding mode decision part 103, an orthogonal transformation part 104, a quantizer 105, an inverse quantizer 109, an inverse orthogonal transformation part 110, an inverse intra processing part 112, a frame memory 113, an in-loop filter 114, a motion detection/compensation unit 120a, coder 106, a transmission buffer 107, and a rate controller 108.

All of the above components except the motion detection/compensation unit 120a are substantially identical to those of a conventionally known image data coding device. Namely, data of a raw image frame to be coded is buffered in the input image memory 101. The buffered image frame data is read in units of a macroblock having sixteen pixels lined in rows and columns alike, and then transferred to each of the intra prediction part 102 and the motion detection/compensation unit 120a. The intra prediction part 102 infers signal levels, which represent pixels constituting a predictive block, from signal levels representing borderline pixels contained in an adjoining block that belongs to the same image frame data as the macroblock to be coded does and that has already been coded. The intra prediction part 102 then calculates differences of the signal levels to obtain residuals. Based on information on the residuals, intra mode coding is selected for the frame data.

The motion detection/compensation unit 120a that predicts motion data in the course of inter mode coding uses reference image frame data stored in the frame memory 113 to detect the position of a block that represents an image analogous to the image represented by a search block, that is, the macroblock that is received from the input image memory 101 and that will be coded. The image represented by the block located at the detected position shall be called a predictive image. For detection of the position of a block representing an analogous image, a reference image block representing a predictive image whose residuals from a raw image number minimum or a predictive image that requires production of a minimum number of code bits is selected.

The coding mode decision part 103 selects a coding mode of higher coding efficiency from between an intra coding mode to be selected by the intra prediction part 102 and an inter coding mode that utilizes information selected by the motion detection/compensation unit 120a. An object-of-coding signal, that is, a predictive error signal selected by the coding mode decision part 103 is transmitted to each of the orthogonal transformation part 104, quantizer 105, coder 106, and transmission buffer 107. Herein, the orthogonal transformation part 104 performs orthogonal transformation such as discrete cosine transform (DCT) so as to transform the received signal into an orthogonal transformation coefficient. The orthogonal transformation coefficient is quantized by the quantizer 105. The transformation coefficient quantized by the quantizer 105 is subjected to lossless coding such as variable length coding or arithmetic coding by the coder 106. Thereafter, the resultant transformation coefficient is stored in the transmission buffer 107 and transmitted as compressed image data.

The transformation coefficient sent from the quantizer 105 is transferred to the inverse quantizer 109 and then inversely quantized. An output of the inverse quantizer 109 is supplied to the inverse orthogonal transformation part 110 and then inversely orthogonally transformed. A code representing an image for which the intra mode is selected by the coding mode decision part 103 is subjected to inverse intra prediction by the inverse intra processing part 112. Decoded image data having undergone the inverse intra prediction is de-blocked by the in-loop filter 114. The image data having blocking deformation removed therefrom is stored in the frame memory 113. Incidentally, the in-loop filter 114 may not be employed.

On the other hand, image data for which the inter mode is selected by the coding mode decision part 103 is inversely orthogonally transformed by the inverse orthogonal transformation part 110. The inversely orthogonally transformed image data is added to an image signal, which is represented by a predictive image block whose motion data has been compensated by the motion detection/compensation unit 120a, by an adder 116. An output of the adder 116 is de-blocked by the in-loop filter 114. The image data having blocking deformation removed therefrom is stored in the frame memory 113.

The motion detection/compensation unit 120a uses image data stored in the frame memory 113 as reference image data to detect a motion vector in units of a macroblock. An image represented by a reference image block has a motion, which is represented by the detected motion vector, compensated, whereby a predictive image (or an image data block having motion data thereof compensated) is produced. At this time, a plurality of frame image data items may be stored in the frame memory and utilized by the motion detection/compensation unit 120a.

A motion vector detected by the motion detection/compensation unit 120a is also transmitted to the coder 106, and converted into a lossless code through variable length coding or arithmetic coding. Predictive image data obtained by the motion detection/compensation unit 120a is transferred to each of a subtracter 115 and the adder 116. The subtracter 115 calculates a difference of the predictive image data from raw image data, and the residual data is utilized for selection of shape mode coding.

Figure 2:
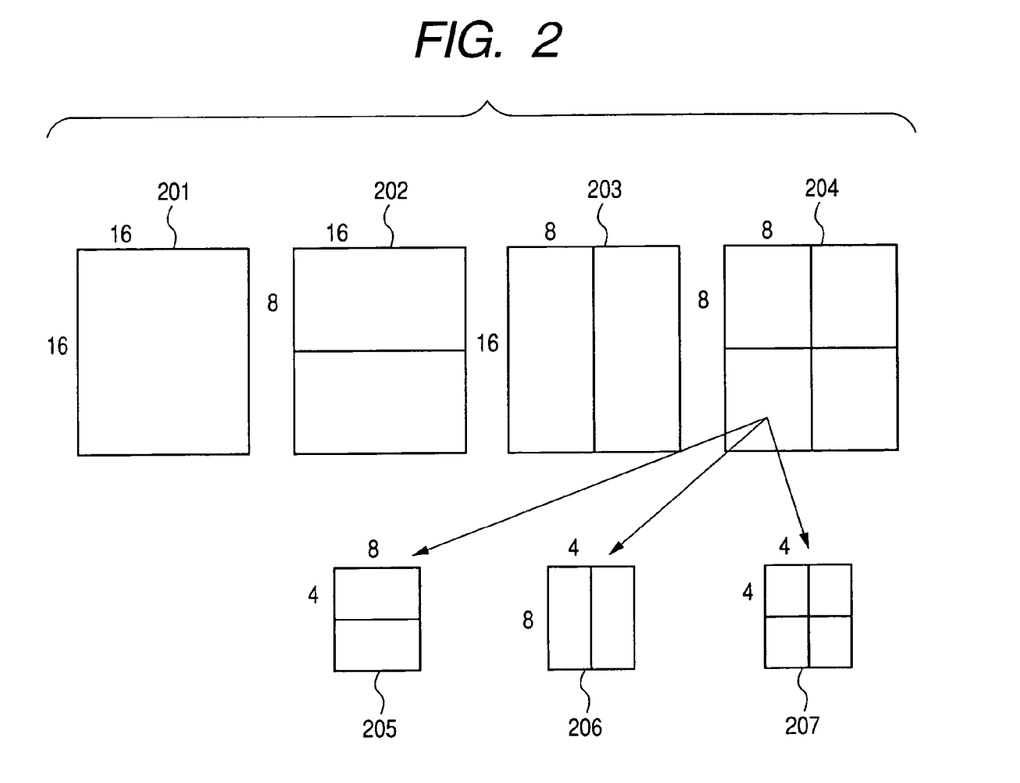
FIG. 2 shows macroblocks and sub-blocks.

Next, actions to be performed by the motion detection/compensation unit 120a that is a major portion of the present invention will be described with reference to FIG. 2, FIG. 3, and FIG. 4.

Figure 4:
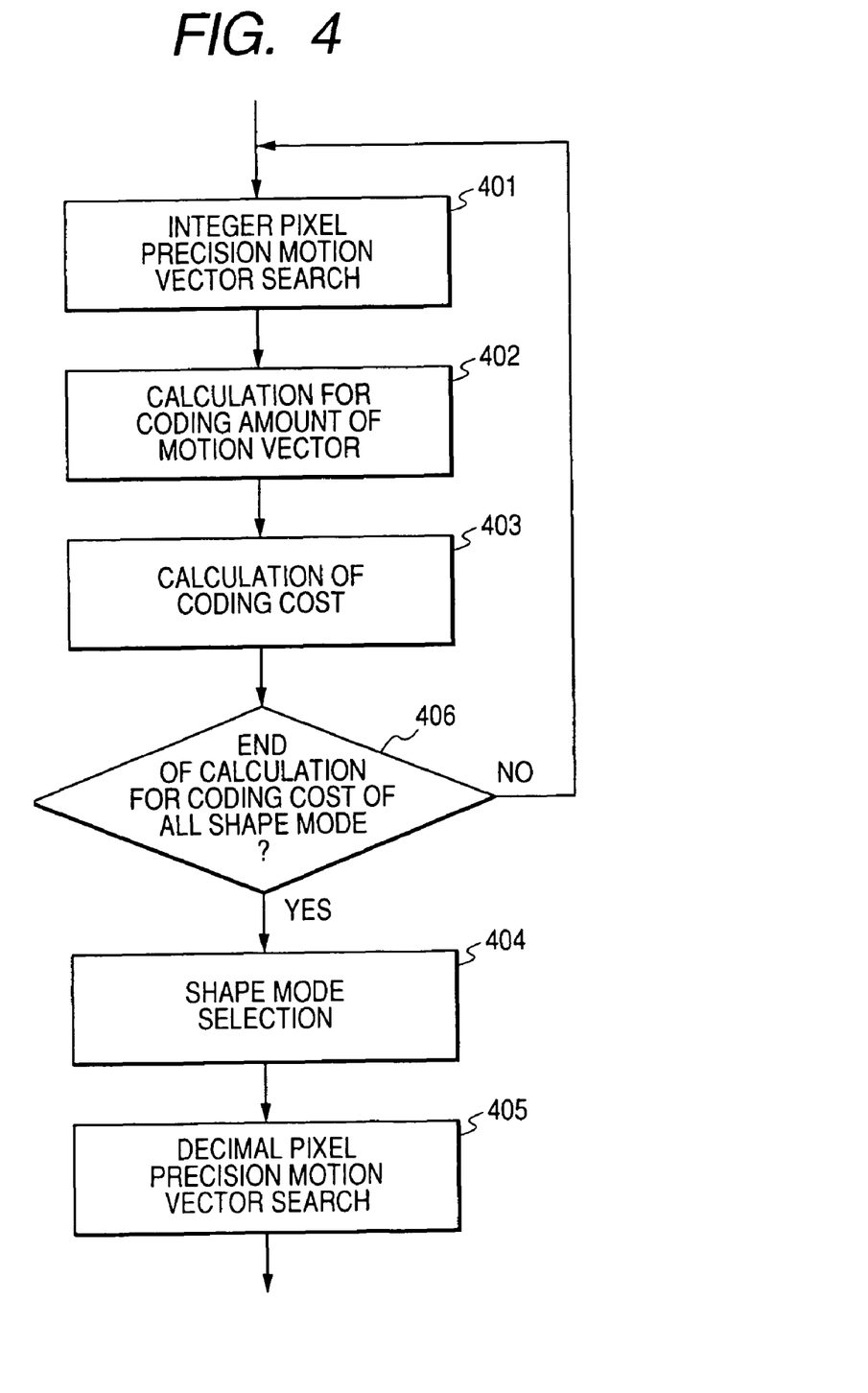
FIG. 4 is a flowchart describing a motion compensation prediction step included in coding to be performed according to the first embodiment.

FIG. 4 is a flowchart describing facilities included in the motion detection/compensation unit 120a or pieces of processing to be performed thereby. In the motion detection/compensation unit 120a, an image block to be coded and reference image data read from the reference frame memory 113 are fetched into an integer pixel precision motion vector search controller 122 according to the control of a motion search controller 121. The integer pixel precision motion vector search controller 122 performs arithmetic operations based on a block matching technique so as to search each of a plurality of types of blocks 201, 202, 203, 204, 205, 206, and 207 (a 16×16 -pixel macroblock and 16×8 (202)-pixel, 8×16 (203)-pixel, 8×8 (204)-pixel, 4×8 (205)-pixel, 8×4 (206)-pixel, and 4×4 (207)-pixel blocks) for a motion vector with integer pixel precision (step 401 in FIG. 4). At this step, the arithmetic operations are performed on all the blocks in order to achieve block matching. Since interpolation for calculating virtual pixels need not be performed, the arithmetic operations are performed quickly. In FIG. 2, a numerical value written on a side of each block denotes the number of-rows or columns of pixels.

In motion vector search, block matching is performed using a search block and a block adjoining the search block in predictive image frame data that is read from the frame memory 113. A vector whose terminal point is located at a position separated from the position of the search block by the smallest error is regarded as an integer pixel motion vector. As the error, a sum of squared differences between pixels contained in raw image data and corresponding pixels contained in predictive image data or a sum of absolute differences between them is adopted.

A coding cost calculation part 123 calculates an amount of coding, that is, the number of code bits needed to represent a motion vector which the motion vector search controller 122 has detected with integer pixel precision in each of a plurality of types of blocks during shape mode coding (step 402 in FIG. 4). The coding cost calculation part 123 calculates a predictive error of an amount of coding needed to represent each motion vector. The amount of coding R needed to represent a motion vector is calculated by coding in a lossless manner a differential motion vector (MVD), that is, a difference between a predictive value of a motion vector calculated from motion vectors detected in surrounding blocks and a searched motion vector. However, a motion vector obtained at step 401 is detectable with integer pixel precision. Namely, the difference MVD of the searched motion vector shall be called an integer pixel precision value MVD. Furthermore, the coding cost calculation part 123 uses the sum of absolute differences of pixels constituting a motion vector detected in each of the blocks, and the integer pixel precision value MVD to calculate a coding cost (step 403 in FIG. 4).

A block shape mode selection part 124 selects a shape of a block that incurs the smallest coding cost among all coding costs calculated by the coding cost calculation part 123, and transmits information on the selected block shape as a shape mode signal to the motion search controller 121 (step 404 in FIG. 4). The motion search controller 121 transmits a decimal pixel precision motion vector search instruction, which instructs search for a motion vector in a block having a shape represented by the shape mode signal, to a decimal pixel precision motion vector search part 125 (step 405 in FIG. 4). The decimal pixel precision motion vector search part 125 selects a block having the shape represented by the shape mode signal. Virtual pixels in the selected block are interpolated, whereby a reference pixel block containing the interpolated virtual pixels is produced. The reference pixel block containing the virtual pixels is matched with a raw image block in order to search a motion vector with decimal pixel precision (step 405 in FIG. 4). Interpolative production of virtual pixels is achieved by performing filtering arithmetic operations. A description will be made of production of a virtual pixel, which is contained in luminance data, with ½ or ¼ pixel precision by performing filtering arithmetic operations.

Figure 3:
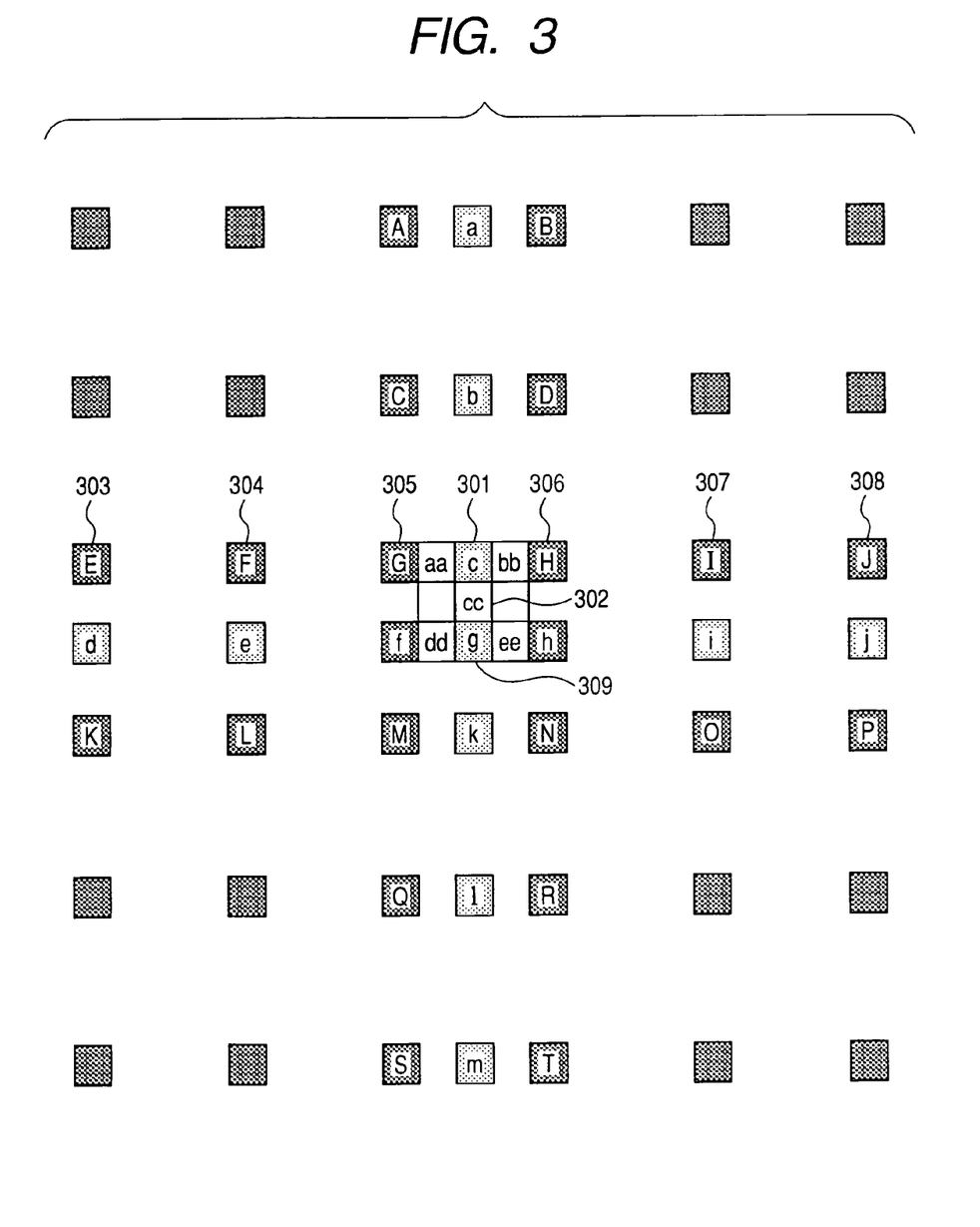
FIG. 3 shows integer pixel positions and decimal pixel positions.

FIG. 3 shows an example of arrangement of pixels for use in explaining virtual pixels to be interpolated. FIG. 3 illustrates actual pixels lined in six rows and six columns alike (for example, A, B to R, S, and T), virtual pixels (a, b, c to 1, and m) enabling detection with ½ pixel detection, and virtual pixels enabling detection with ¼ pixel precision. A virtual pixel c(301) detectable with ½ pixel precision is produced using integer pixels E(303), F(304), G(305), H(306), I(307), and J(308) according to the following formula (1):

$$c=\text{round}((E-5*F+20*G+20*H-5*I+J)/32) \quad (1)$$

where round denotes rounding, and numerals 5 and 20 denotes filtering coefficients.

Filtering intended to provide ¼ pixel precision calculates a mean of virtual pixel values detectable with ½ pixel precision. For example, a virtual pixel cc(302) detectable with ¼ pixel precision shown in FIG. 2 is calculated using pixels c(301) and g(309) according to the following formula (2).

$$cc=\text{round}((c+g)/2) \quad (2)$$

In general, as the number of filtering coefficients is larger, the number of arithmetic operations to be performed for interpolation gets larger because interpolation is one form of filtering.

Figure 10:
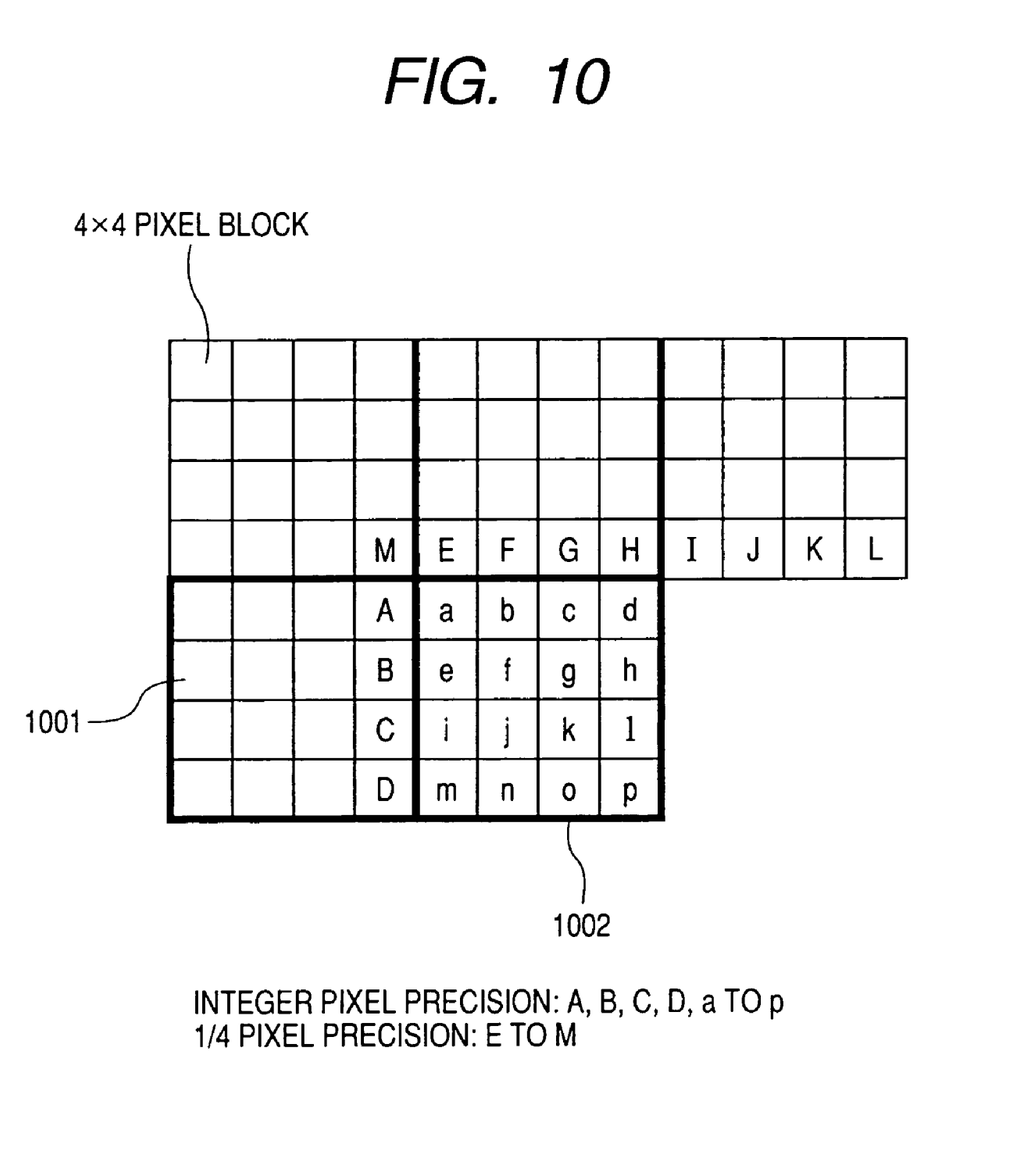
FIG. 10 shows a distribution of pixels for use in explaining pixel precision with which macroblocks are searched for a motion vector.

Herein, as a coding cost, a sum of squared differences (SSD) between raw image data and predictive image data may be adopted instead of a sum of arithmetic differences (SAD). However, the employment of only the sum of arithmetic differences (SAD) or the sum of squared differences (SSD) degrades coding efficiency because a shape mode of a smaller block shape is likely to be selected. Therefore, an estimation function that takes account of an amount of coding needed to represent a difference of a motion vector is generally adopted. A predictive motion vector employed in a case where the estimation function is used to calculate a coding cost is a motion vector detectable with integer pixel precision as long as a motion vector detectable with decimal pixel precision cannot be detected in an adjoining block. For example, assume that pipelining is performed in units of a macroblock, and that search for a motion vector detectable with integer pixel precision and search for a motion vector detectable with decimal pixel precision are performed in different stages. In this case, as shown in FIG. 10, among motion vectors in blocks A to M (each having four pixels lined in rows and columns alike) surrounding a macroblock (1002) to be coded and being used for calculation of a coding cost, only the blocks A to D contained in a macroblock (1001) preceding the macroblock to be coded (1002) can be used to detect a motion vector with integer pixel precision. According to the present method, selection of a block shape mode need not be delayed until the completion of search for a motion vector with decimal pixel precision. Specifically, since selection of a block shape mode can be performed immediately after search for a motion vector with internal pixel precision, coding can be performed quickly. Incidentally, an amount of coding needed to represent a difference of a motion vector detectable with integer pixel precision is nearly equal to an amount of coding needed to represent a difference of a motion vector detectable with decimal pixel precision. A difference of a coding cost incurred by one motion vector from that incurred by another hardly varies, and an adverse effect on deterioration of coding performance is limited. The present method can be adapted to any of embodiments to be described below.

A motion compensation part 126 uses motion vector data detectable with decimal pixel precision in a shape mode selected by the decimal pixel precision motion vector search part 125, and predictive effort data to produce predictive image data. Part of the motion vector data is transferred to the coder 106 and then coded. Moreover, the predictive image data is transferred to the subtracter 115.

Second Embodiment

Figure 5:
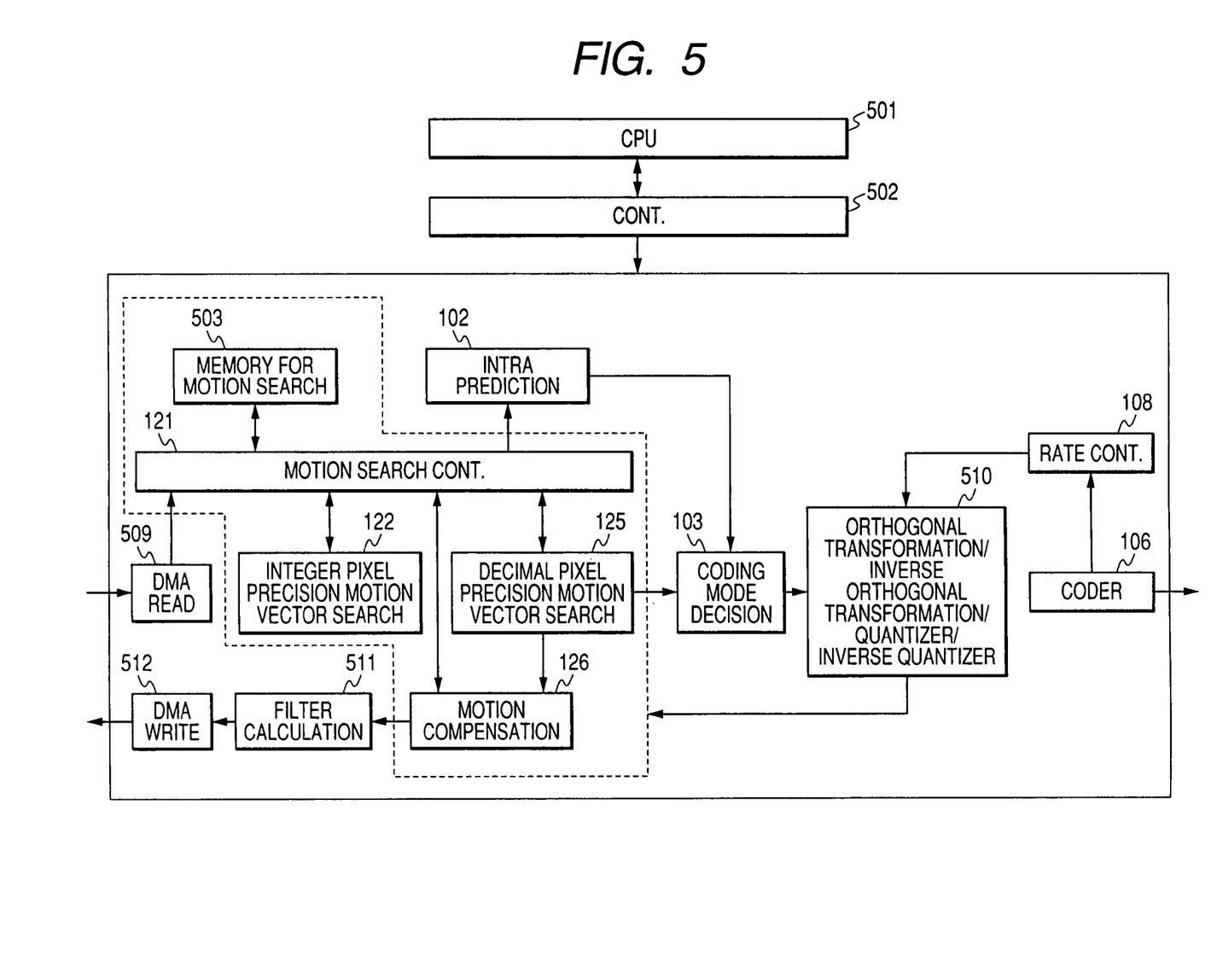
FIG. 5 is a block diagram showing the configuration of an embodiment of a motion compensation image coding device in accordance with the present invention including a signal processing unit such as a CPU.

FIG. 5 is a block diagram showing the configuration of the second embodiment of a motion compensation image coding device in accordance with the present invention that includes a signal processing unit such as a CPU. The same reference numerals as those written in FIG. 1 are assigned to functional blocks identical to those included in the first embodiment shown in FIG. 1, and an iterative description will be omitted. Data transmission and control illustrated in FIG. 1 are achieved by a control unit 502. Moreover, data is read from the input image memory 101 or frame memory 113 by a DMA reader 509 and transferred to a motion detection/compensation unit 120a.

The motion detection/compensation unit 120a includes a motion search controller 121, an integer pixel precision motion search part 122, a decimal pixel precision motion search part 125, a motion compensation part 126, and a motion search memory 503. Moreover, the intra prediction part 102 that selects an intra mode, the coding mode decision part 103 that selects the intra mode or an inter mode, the coder 106 that performs coding in a lossless manner, the rate controller 108 that controls a rate, and the in-loop filter 114 that performs de-block filtering correspond to an intra prediction part 102, a coding mode decision part 103, a coder 106, a rate controller 108, and a filter calculation part 511 respectively which are shown in FIG. 5. The orthogonal transformation part 104, quantizer 106, inverse quantizer 109, and inverse orthogonal transformation part 110 which are shown in FIG. 1 correspond to an orthogonal transformation part/inverse orthogonal transformation part and quantizer/inverse quantizer 510. Data treated by the filter calculation part 511 is written in the frame memory 113 (not shown) by a DMA writer 512. A recording medium is included so that a program that executes the steps of searching a motion vector described in FIG. 4 can be stored in the recording medium. The program is run in order to implement a motion vector search unit (indicated with a dashed line in FIG. 5).

Third Embodiment

Figure 6:
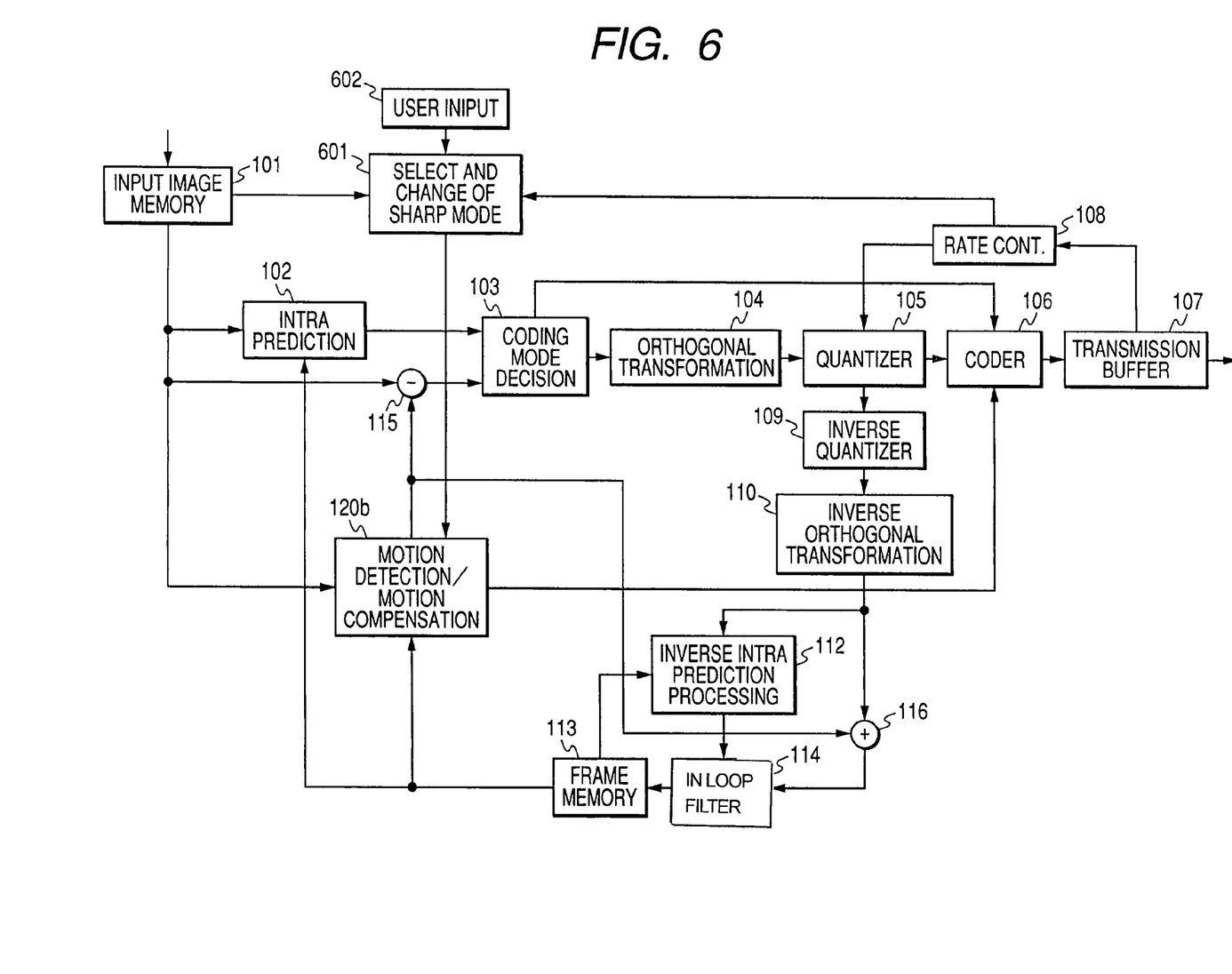
FIG. 6 is a block diagram showing the configuration of another embodiment of a motion compensation image coding device in accordance with the present invention.

FIG. 6 is a block diagram showing an example of the configuration of another embodiment of a motion compensation image coding device in accordance with the present invention. The third embodiment is such that before a motion vector detectable with decimal pixel precision is searched, whether a shape mode should be selected is determined. In general, when pixel precision is raised, residuals derived from motion compensation prediction get smaller. Consequently, the number of produced code bits is decreased. Eventually, precision efficiency improves. On the other hand, if pixel precision is raised, the number of pixels to be filtered increases and an arithmetical load increases.

The same reference numerals as those shown in FIG. 1 are assigned to functional blocks substantially identical to those of the motion compensation image coding device in accordance with the first embodiment shown in FIG. 1, and an iterative description will be omitted. A difference from the motion compensation image coding device in accordance with the first embodiment lies in a point that a shape mode selection/change part 601 is added to the configuration of the first embodiment. The shape mode selection/change part 601 determines based on an input image, a frame rate, or the number of produced code bits whether a shape mode should be selected prior to search for a motion vector with decimal pixel precision. For example, the rate controller 108 shown in FIG. 6 obtains an amount of coding, that is, the number of code bits needed to present a macroblock. If the number of produced code bits is large, the rate controller 108 extends control so as to increase quantization parameters for the purpose of decreasing the number of code bits needed to represent the next macroblock. This leads to an increase in a quantization error and deterioration of image quality. Therefore, after search for a motion vector with integer pixel precision or decimal pixel precision is completed, a shape mode is selected in order to improve prediction precision.

Figure 7:
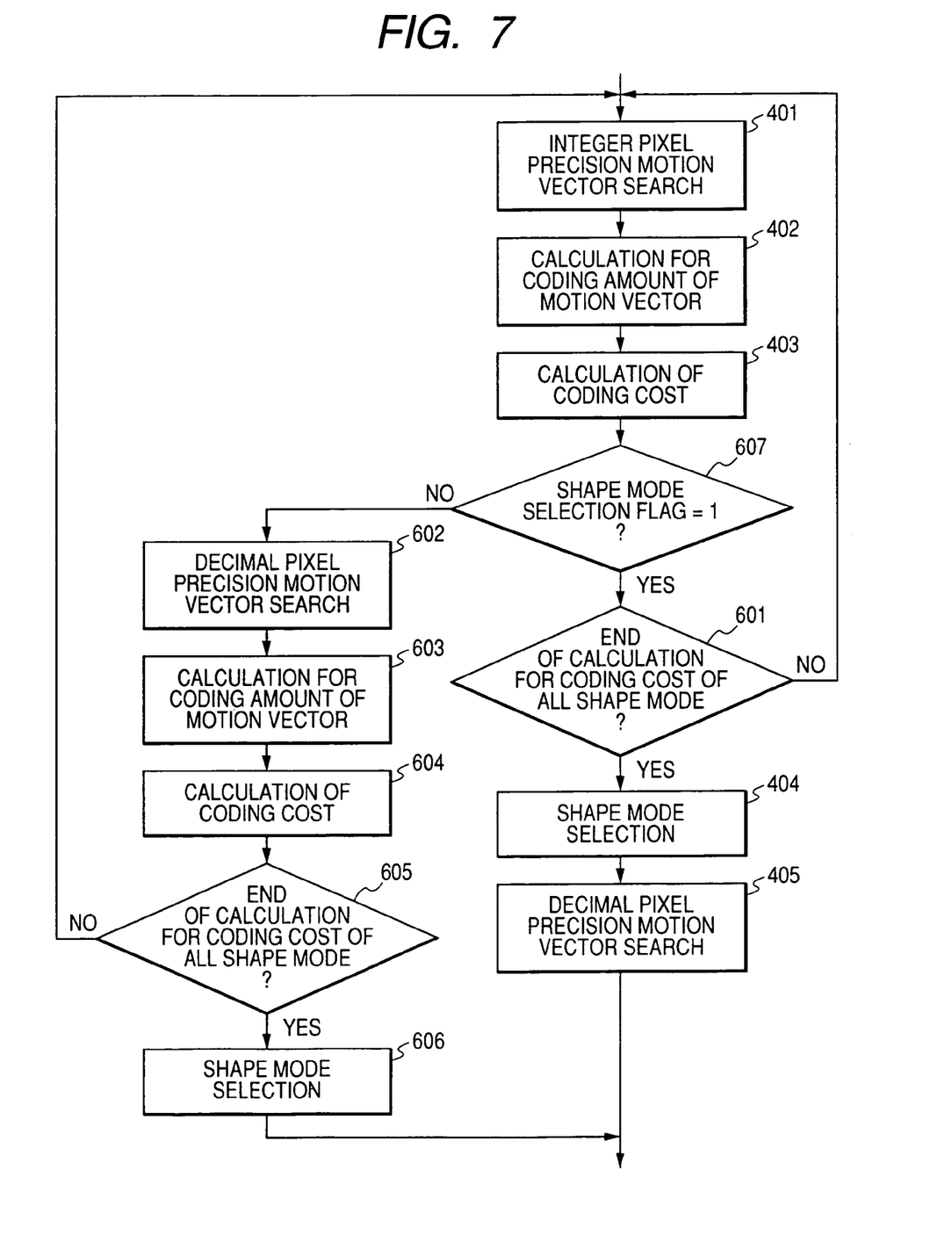
FIG. 7 is a flowchart describing the capabilities of a motion detection/compensation unit 120 included in the embodiment shown in FIG. 6 or pieces of processing to be performed by the motion detection/compensation unit 120.

Next, the facilities included in a motion detection/compensation unit 120b or the pieces of processing to be performed thereby will be described below. FIG. 7 is a flowchart describing the facilities included in the motion detection/compensation unit 120b or the pieces of processing to be performed thereby in the embodiment in FIG. 6. Referring to FIG. 7, integer pixel precision motion vector search 401, motion vector code bit calculation 402, and coding cost calculation 403 are identical to those performed in the first embodiment. However, shape mode selection is performed as described below.

A shape mode selection/change part 601 has a flag (hereinafter a shape mode selection flag) to be used to determine whether a shape mode is selected prior to search for a motion vector with decimal pixel precision. When the shape mode selection flag is reset to 0, the motion detection/compensation unit 120b performs neither shape mode selection 404 nor decimal pixel precision motion vector search 405 based on the results of the shape mode selection 404. Namely, all blocks (macroblocks and sub-blocks) are searched for a motion vector with decimal pixel precision (step 602). An amount of coding, that is, the number of code bits needed to represent each motion vector is calculated (step 603). An error derived from decimal pixel precision motion vector search (step 602) and the amount of coding, that is, the number of code bits needed to represent each motion vector and calculated at step 603 are used to calculate a coding cost (step 604). A sum of arithmetic differences (SAD), a sum of squared differences (SSD), or an estimation function may be adopted as the coding cost. When calculation of a coding cost is completed for all shape modes, a shape mode incurring the smallest coding cost is selected (step 606).

On the other hand, if the shape mode flag is set to 1, the motion detection/compensation unit 120b selects a shape mode (step 404) prior to search for a motion vector with decimal pixel precision (step 405). Only blocks of the selected shape mode are searched for a motion vector with decimal pixel precision (step 405). Then, motion detection/compensation prediction is terminated. The meanings of the values 1 and 0 exhibited by the shape mode selection flag are not limited to the foregoing ones. Any meanings will do as long as they express two alternative states such as on and off states. Alternatively, the above meanings may be oppositely associated with the values 1 and 0.

A unit in which the values of the shape mode selection flag are switched may be, for example, a macroblock, a slice, a frame, or a sequence. Moreover, a user may determine whether a shape mode should be selected prior to search for a motion vector with decimal pixel precision. At this time, a user input unit 602 is, as shown in FIG. 6, included additionally. The user input unit receives an instruction that signifies whether a shape mode should be selected prior to search for a motion vector with decimal pixel precision and that is entered by a user, and transmits a signal, which signifies whether the shape mode selection flag should be set or reset, to the shape mode selection/change part 601.

Owing to the configuration of the present embodiment, when large-size image data such as high-definition image data is coded, a shape mode is selected after completion of search for a motion vector with integer pixel precision, and blocks of the selected shape mode alone are searched for a motion vector with decimal pixel precision. Consequently, processing time required for coding can be shortened. On the contrary, if small-size image data such as QCIF (Quarter Common Intermediate Format) image data is coded, since an amount of data to be arithmetically treated is limited, after blocks of all shape modes are searched for a motion vector with integer pixel precision and decimal pixel precision alike, any of the shape modes may be selected. In this case, priority is given to high prediction efficiency. If a coding device enjoys high coding performance, that is, can treat many blocks for a short period of time, after blocks of all shape modes are searched for a motion vector with integer pixel precision and decimal pixel precision alike, any of the shape modes may be selected. In this case, priority can be given to high precision efficiency.

As mentioned above, according to the present embodiment, trade-off between prediction efficiency and an arithmetical load is controlled depending on the size of input image data or the performance of a coding device. Consequently, a video signal can be coded with high freedom.

Fourth Embodiment

Figure 8:
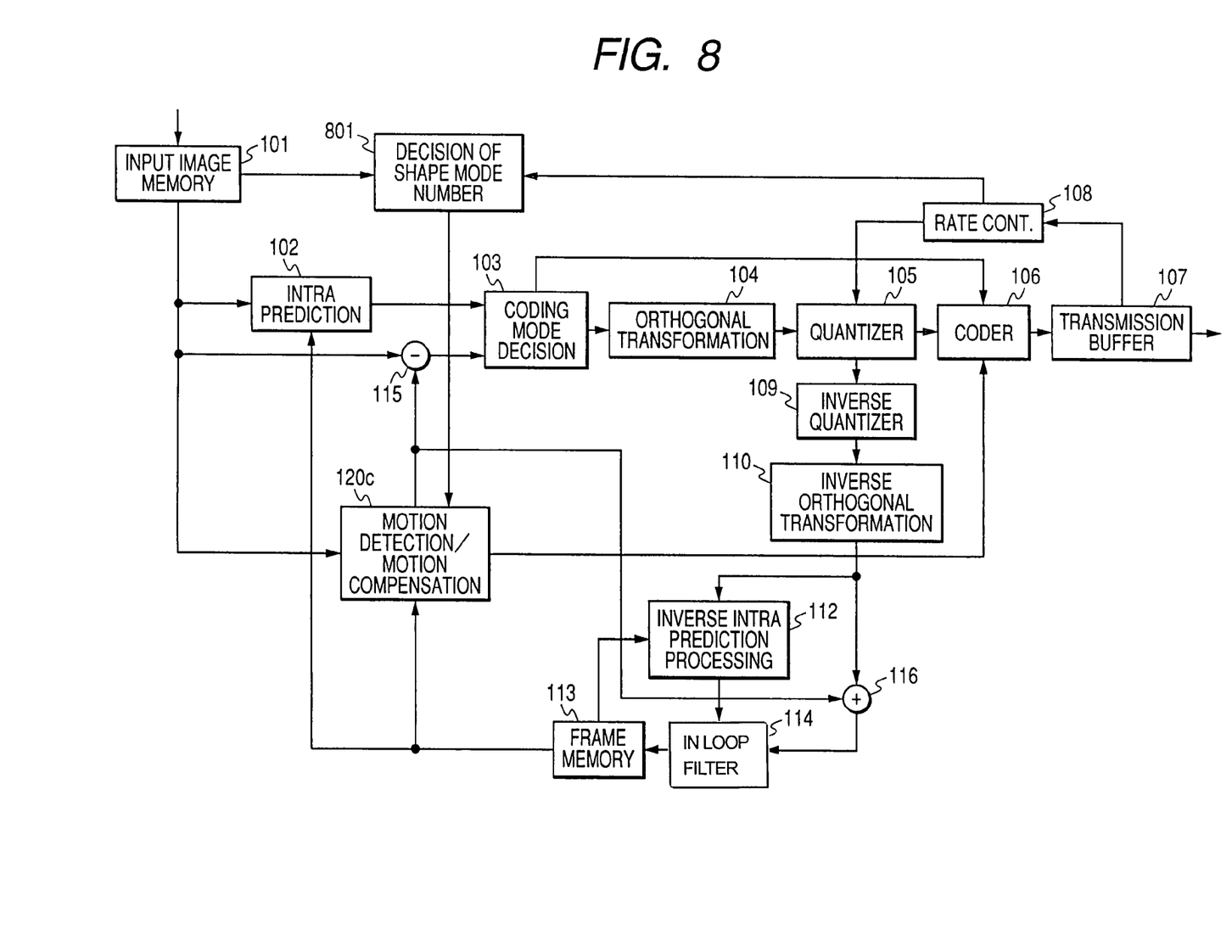
FIG. 8 is a block diagram showing the configuration of still another embodiment of a motion compensation image coding device in accordance with the present invention.

FIG. 8 is a block diagram showing the configuration of still another embodiment of a motion compensation image coding device in accordance with the present invention. The fourth embodiment is configured so that the number of shape modes to be selected will be determined prior to search for a motion vector with decimal pixel precision. Specifically, the present embodiment is a motion compensation image coding device designed to select a plurality of shape modes after completion of search for a motion vector with integer pixel precision. A difference from the motion compensation image coding device in accordance with the aforesaid embodiment lies in a point that a number-of-shape modes determination part 801 is included. The same reference numerals as those written in FIG. 1 are assigned to functional blocks substantially identical to those of the motion compensation image coding device in accordance with the first embodiment. An iterative description will be omitted. Specifically, the number of block shape modes is set to n according to the size of input image data. For example, for large-size image data such as high-definition image data, the number of block shape modes is set to 1. For SDTV image data, the number of block shape modes is set to 2. Thus, the number of shape modes to be selected increases as the size of image data gets smaller.

Moreover, n thresholds (Th1>Th2>Th3>. etc., >Thn) are predefined for a frame rate at which coding is performed. If the frame rate falls within a certain threshold (for example, Th1<threshold<Th2), the number of shape modes is set to 2. Herein, the larger the threshold Th is, the smaller the number of block shape modes to be selected is. In the foregoing cases, the number of shape modes depends on input image data or a frame rate. Alternatively, the number of shape modes may depend on the performance of a coding device. Namely, if the coding device can afford to arithmetically treat a larger amount of data, the number of block shape modes is increased. In contrast, if the coding device cannot afford to arithmetically treat a larger amount of data, the number of block shape modes is decreased.

The number-of-shape modes determination part 801 determines the number of shape modes to be selected prior to search for a motion vector with decimal pixel precision. A user may arbitrarily determine the number of shape modes to be selected. The number of shape modes to be selected may be determined according to input image data, a frame rate, or the number of produced code bits. The number-of-shape modes determination part 801 includes a flag (hereinafter a number-of-shape modes determination flag) with which the number of shape modes to be selected is determined. Among a plurality of shape modes, the number of shape modes indicated with the value of the number-of-shape modes determination flag is selected and blocks of the selected shape modes are searched for a motion vector with decimal pixel precision. The number-of-shape modes determination part 801 and the components of the motion detection/compensation unit 120c or the pieces of processing to be performed thereby will be described below.

Figure 9:
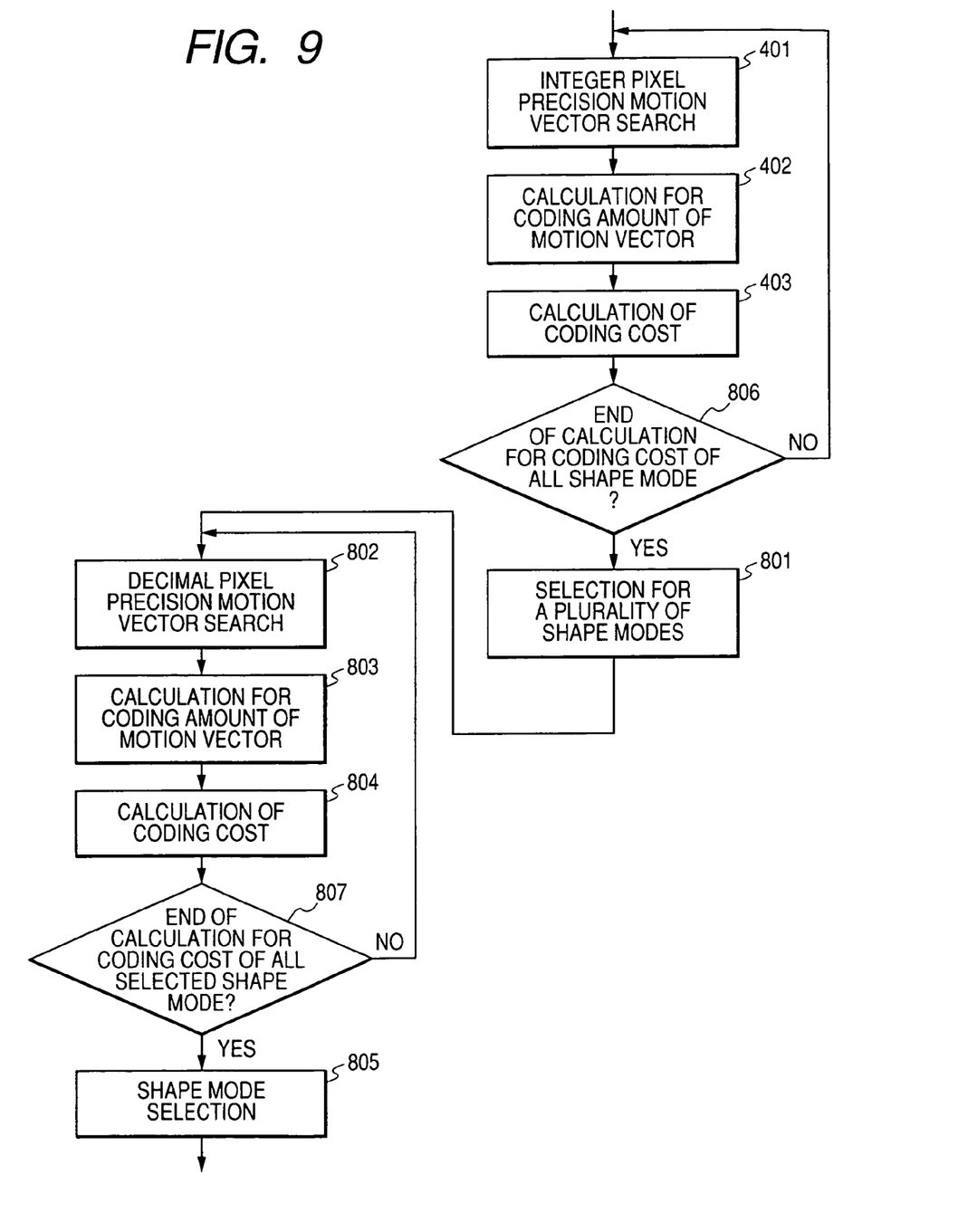
FIG. 9 is a flowchart describing processing to be performed by a motion detection/compensation unit 120 shown in FIG. 8.

FIG. 9 is a flowchart describing the functional components of the motion detection/compensation unit 120 or the pieces of processing to be performed thereby. Similarly to the aforesaid embodiment, search for a motion vector with integer pixel precision (step 401), calculation of an amount of coding, that is, the number of code bits needed to represent a motion vector (step 402), and calculation of a coding cost (step 403) are carried out. After completion of the calculation of a coding cost (step 403), a plurality of shape modes are selected based on the results of the calculation of a coding cost performed at step 403 (step 803). For example, if the number-of-shape modes determination flag has a value 3, blocks of three high-order block shapes that incur small coding costs are searched for a motion vector with decimal pixel precision. Incidentally, a sum of arithmetic differences (SAD), a sum of squared differences (SSD), or an estimation function may be adopted as the coding cost. The number-of-shape modes determination flag is not limited to the value 3. The number-of-shape modes determination flag may assume any value as long as a block type can be identified.

The motion detection/compensation unit 120 calculates an amount of coding, that is, the number of code bits needed to represent each of motion vectors that are detected (step 802) by searching blocks of the selected plurality of shape modes with decimal pixel precision (step 803). A coding cost is calculated based on an error derived from search for a motion vector with decimal pixel precision and the amount of coding, that is, the number of code bits needed to represent the motion vector (step 804). A sum of arithmetic differences (SAD), a sum of squared differences (SSD), or an estimation function may be adopted as the coding cost. If the calculation of the coding cost is completed for the blocks of all the selected shape modes (step 807), a shape mode incurring the smallest coding cost is finally selected from among all the selected shape modes (step 805).

The value of the number-of-shape modes determination flag may be varied in units of, for example, a macroblock, a slice, a frame, or a sequence. Even if the size of input image data is as large as high-definition image data, as long as the performance of a coding device is very high, the coding device can search blocks of a plurality of shape modes for a motion vector, though the coding device may not be able to search the blocks for a motion vector with decimal pixel precision. However, according to the third embodiment, the number of shape modes to be selected after completion of search for a motion vector with integer pixel precision is only one. Therefore, the trade-off between prediction efficiency and an arithmetical load cannot be finely controlled. In contrast, according to the present embodiment, even if coding is performed under the aforesaid conditions, blocks of a plurality of shape modes can be searched for a motion vector with decimal pixel precision. Therefore, the trade-off between prediction efficiency and an arithmetical load can be finely controlled. In short, a video signal can be coded with higher freedom than it can be according to the third embodiment.

According to the aforesaid embodiments, a unit of an input image is a frame. The present invention can apply to a case where an input image is a field because of adoption of interlacing. Moreover, the present invention can apply to a case where predictive image data to be read from the frame memory by the motion detection/compensation unit 120 is produced using temporally preceding and succeeding frame data items.

Incidentally, the present invention can be adapted to a coding method, in which motion data in each of blocks of a plurality of shape modes is compensated, other than the MPEG coding method, and will exert an effect of minimizing an amount of data to be processed.

The present invention is adapted to an imaging apparatus such as a digital video camera or a digital still camera using as a recording medium an optical disk (DVD), a tape, or a semiconductor memory. Moreover, the present invention can be adapted to a portable cellular phone having a mechanism of producing an image and storing the image internally. Furthermore, the present invention can be adapted to an image recording/reproducing apparatus for recording television pictures such as a hard disk drive (HDD) or a DVD. The present invention is preferably adapted to an apparatus including a coding unit that codes in real time a fetched image, and a recording means for recording the image, which is coded by the coding unit, in a recording medium, for example, a memory or an optical disk.

To be more specific, a coding unit in accordance with the present invention to be included in an apparatus can code in real time image data, which has an SD size (namely, the number of pixels is a product of approximately 720 pixels by 480 pixels) and of which frame frequency is approximately 30 frames per second (fps), at an operating frequency of approximately 54 MHz. As far as the image data of the SD size is concerned, the number of macroblocks contained in one screen image data piece or the number of macroblocks per frame is, for example, approximately 1350 and the number of macroblocks per second is approximately 40500 (=1350 by 30). When search for a motion vector with decimal pixel precision is performed on the SD-size image data in one stage through pipelining, if one macroblock is treated in real time at an operating frequency of 54 MHz, one macroblock must be treated until 1333 clocks are counted up (24.69 μsec=1/40500×54 MHz). Therefore, if blocks of one block shape mode can be searched for motion data with decimal pixel precision during a period needed to count up 1333 clocks, that is, for approximately 25 μsec or less (approximately 24 to 25 μsec), real-time processing can be achieved. According to the present invention, blocks can be searched for motion data with decimal pixel precision during such a short period of time. Therefore, when the present invention is adapted to an imaging apparatus or an image recording/reproducing apparatus, SD-size image data can be coded or recorded in real time.

Needless to say, the present invention is not limited to coding or recording of SD-size image data but can be applied to coding or recording of image data of any other size. However, the present invention speeds up coding of image data by largely reducing the number of arithmetic operations to be performed in order to search a motion vector. The present invention can preferably be applied to real-time coding of image data having a size equal to or larger than the SD size.

What is claimed is:

1. A motion picture coding device that searches a motion vector in units of one of blocks into which data of a frame of a motion picture is divided, compensates or predicts motion data using the searched motion vector so as to produce predictive image data, and codes a difference signal, which represents a difference between the predictive image data and the motion picture data, and the motion data, comprising:

a motion search unit that searches the motion data and comprises:

a first motion vector detecting part that searches a plurality of first pixel blocks and a plurality of sub-blocks of different shapes, into which each of the plurality of first pixel blocks is divided, for a motion vector with integer pixel precision;

a shape mode selection part that selects one block or a plurality of blocks of different shapes according to information acquired by the first motion vector detecting part; and a second motion vector detecting part that searches one sub-block or a plurality of sub-blocks, which is selected by the shape mode selection part, for a motion vector with decimal image precision.

2. The motion picture coding device according to claim 1, wherein:

the shape mode selection part includes a cost calculation part that calculates a coding cost which is incurred in coding each of blocks of different shapes through the search for a motion vector by the first motion vector detecting part, and determines a shape of a block that incurs the smallest coding cost; and the second motion vector detecting part searches the block of the shape, which incurs the smallest coding cost, for a motion vector with decimal pixel precision.

3. The motion picture data coding device according to claim 1, wherein:

the shape mode selection part includes a cost calculation part that calculates a coding cost, which is incurred in coding each of blocks of different shapes through the search for a motion vector by the first motion vector detecting part, and that determines a plurality of shapes of blocks in ascending order of the coding cost; and the second motion vector detecting part searches the plurality of blocks of different shapes for a motion vector with decimal pixel precision, and calculates a coding cost which is incurred in coding the plurality of blocks of different shapes through the search for a motion vector with decimal pixel precision; and the shape mode selection part determines a shape of a block that incurs the smallest coding cost.

4. The motion picture data coding device according to claim 1, wherein:
the motion search unit that searches a motion vector includes a coding mode selection/change part that extends control so as to determine whether the second motion vector detecting part should be driven; and
if the motion search unit determines that the second motion vector detecting part is not driven, the motion search unit does not drive the second motion vector detecting part, but searches blocks of all shape modes for a motion vector with decimal pixel precision so as to determine a motion vector.

5. The motion picture data coding device according to claim 1, wherein:
the plurality of first pixel blocks is a plurality of macroblocks each having sixteen pixels lined in rows and columns alike; and
the sub-blocks are blocks having sixteen pixels lined in rows and eight pixels lined in columns, having eight pixels lined in rows and sixteen pixels lined in columns, having eight pixels lined in rows and columns alike, having four pixels lined in rows and eight pixels lined in columns, having eight pixels lined in rows and four pixels lined in columns, or having four pixels lined in rows and columns alike; and
the decimal pixel precision includes ½ pixel precision and ¼ pixel precision.

6. A non-transitory computer-readable medium storing a program instructing a computer to execute a motion picture coding procedure of searching a motion vector in units of each of blocks into which data of a frame of a motion picture is divided, compensating or predicting motion data using-the searched motion vector so as to produce predictive image data, and coding a difference signal, which represents a difference between the predictive image data and the motion picture data, and the motion data, wherein:
a motion search procedure comprises:
a first step of searching a plurality of first pixel blocks and sub-blocks of different shapes, into which each of the plurality of first pixel blocks is divided, for a motion vector with integer pixel precision;
a second step of selecting one block or a plurality of blocks of different shapes according to information obtained at the first step; and
a third step of searching one sub-block or a plurality of sub-blocks, which is selected at the second step, for a motion vector with decimal pixel precision.

7. The non-transitory computer-readable medium according to claim 6, wherein the second step includes a fourth step of calculating a coding cost and producing shape mode data with which a shape of a block incurring the smallest coding cost is identified.

8. The non-transitory computer-readable medium according to claim 6, wherein the second step includes:
a fifth step of calculating a coding cost and identifying a plurality of blocks of different shapes in ascending order of the coding cost;
a sixth step of searching the plurality of blocks of different shapes, which is identified at the fifth step, for a motion vector with decimal pixel precision; and
a seventh step of calculating a coding cost, which is incurred in coding each of the motion vectors searched at the sixth step, and producing shape mode data with which a shape of a block that incurs the smallest coding cost is identified.

9. The non-transitory computer-readable medium according to claim 6, further comprising:
a step of determining whether the second step should be executed after the first step;
a seventh step of, if the second step is determined to be executed, executing the second step, and of, if the second step is not determined to be executed, searching all the sub-blocks of different shapes for a motion vector with decimal pixel precision; and
an eighth step of selecting a motion vector, which is detected in a block incurring the smallest coding cost, from among the motion vectors searched with decimal pixel precision at the seventh step.

10. The non-transitory computer-readable medium according to claim 6, wherein:
the plurality of first pixel blocks is a plurality of macroblocks each having sixteen pixels lined in rows and columns alike;
the sub-blocks are blocks having sixteen pixels lined in rows and eight pixels lined in columns, having eight pixels lined in rows and sixteen pixels lined in columns, having eight pixels lined in rows and columns alike, having four pixels lined in rows and eight pixels lined in columns, having eight pixels lined in rows and four pixels lined in columns, or having four pixels lined in rows and columns alike; and
the decimal pixel precision includes ½ pixel precision and ¼ pixel precision.

* * * * *